(No Model.)

H. SEWREY.
METAL DRIVING BELT.

No. 523,012. Patented July 17, 1894.

Witnesses
F. Clarke.
E. H. Phillips.

Inventor
Henry Sewrey
by Ridout & Maybee
attys

UNITED STATES PATENT OFFICE.

HENRY SEWREY, OF BARRIE, CANADA.

METAL DRIVING-BELT.

SPECIFICATION forming part of Letters Patent No. 523,012, dated July 17, 1894.

Application filed November 15, 1893. Serial No. 491,012. (No model.)

*To all whom it may concern:*

Be it known that I, HENRY SEWREY, of the town of Barrie, in the county of Simcoe and Province of Ontario, Canada, have invented a certain new and Improved Metal Driving-Belt, of which the following is a specification.

The object of my invention is to construct a cheap, durable and light driving belt, and it consists essentially, of a band of metal having a facing of cotton, leather or other suitable material secured to its surface, substantially as hereinafter more particularly explained and then definitely claimed.

Figure 1:
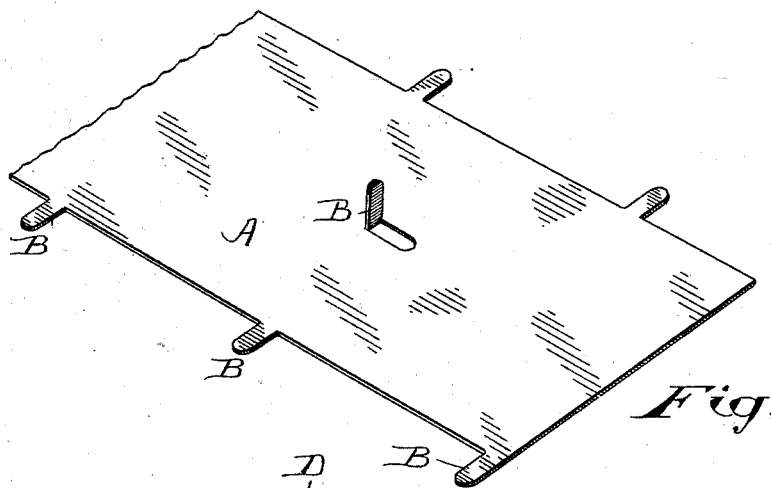
Figure 3:
Figure 2:
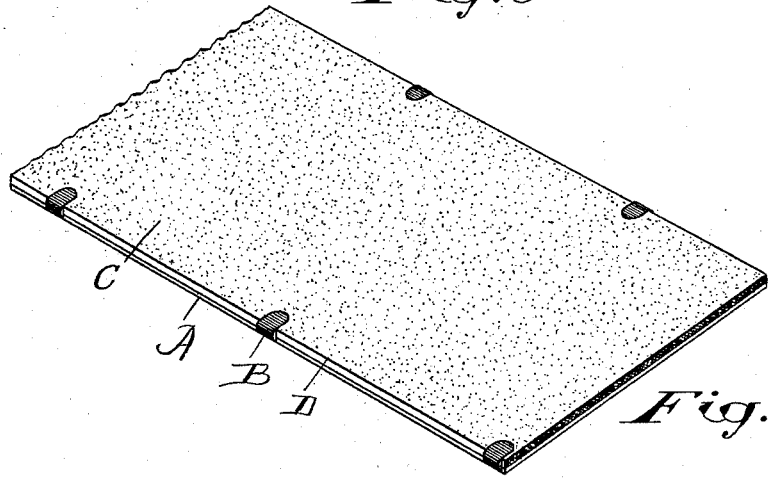

In the accompanying drawings Figure 1, is a perspective view of a portion of my metal belt before the facing is applied. Fig. 2, is a perspective view of a portion of my belt with the facing applied. Fig. 3, is a cross section of the same.

In the drawings, like letters of reference indicate corresponding parts in the different figures.

A, is a belt formed of sheet steel and having fingers B, formed on or connected to its edges.

C, is a facing of cotton webbing cemented to the metal.

D, is a thin coat of rubber applied to the cotton and intended to form the frictional surface of the belt.

When the facing has been applied, the fingers B, are turned over it as shown.

I am aware that longitudinal metal strips have been used to strengthen belts made of leather or other flexible material, but such belts are both heavy and expensive and are no better than a simple leather belt, but I am not aware that a metal belt with a facing of a suitable material to produce the necessary friction on the face of the pulley has ever been used prior to my invention. Such a belt is infinitely better and lighter than the class of belts previously referred to and considerably cheaper as the facing having no stretching strain to withstand, can be made of a much less expensive material than such belts require.

The difficulty to overcome in the construction of a faced metal belt is to provide a reliable method of securing the facing to the belt, cement alone in the case of a leather facing where a heavy strain is brought to bear would be liable to yield in time. I find, however, that a facing of cotton or other webbing will be much more securely held by cement than any other substance but that it is preferable to face the cotton itself with a thin layer of rubber to insure sufficient friction on the face of the pulley. Cement alone is not sufficient in wide belts to form a perfect connection especially at the edges, but the fingers used by me form a very efficient connection. As they are run over the pulley they are pressed into the facing and the greater the strain on the belt the closer they are pressed to the facing and the more firmly the belt and facing are held together. These fingers may be arranged in different ways. They may for instance be cut out of the substance of the belt and turned outward toward the edges or they may be formed as indicated in Fig. 1, and used to strengthen the connection at points intermedtate between the edges.

Although I find the cotton and rubber the best material for facing, a considerable degree of utility may be obtained with leather or paper when attached with a very flexible cement and especially in wide belts when used with the fingers shown and described.

What I claim as my invention is—

1. As a driving belt, a band of metal having a face of cotton, leather or other suitable material cemented thereto, in combination with fingers projecting from the metal band and turned over the facing, substantially as and for the purpose specified.

2. As a driving belt, a band of metal having a facing of cotton or other webbing cemented thereto, the said webbing having a layer of rubber applied to the face coming in contact with the pulley, in combination with fingers projecting from the metal band and turned over the facing, substantially as and for the purpose specified.

3. As a driving belt, a band of metal having a facing of cotton, leather or other suitable material connected thereto by fingers projecting from the metal band, and turned over the facing, substantially as and for the purpose specified.

Barrie, October 25, 1893.

H. SEWREY.

In presence of—
E. BEMROSE,
G. H. BALL.